J. P. & J. Grove,
Mechanical Puddler,
No. 19,843
Patented Apr. 6, 1858.
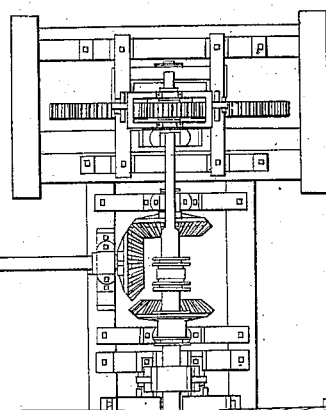
Fig. 1.
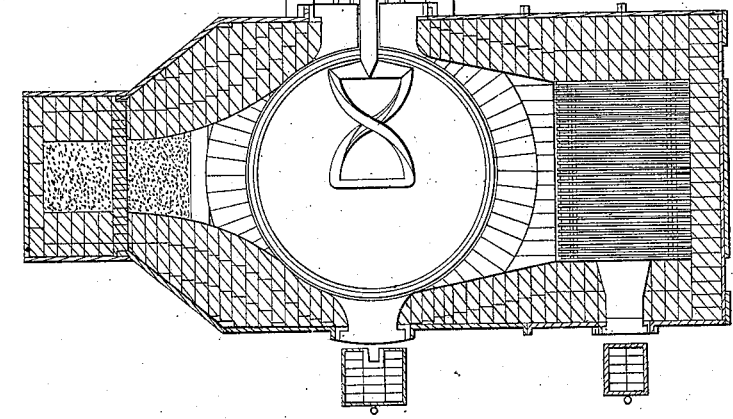
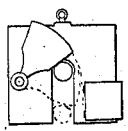
Fig. 2.
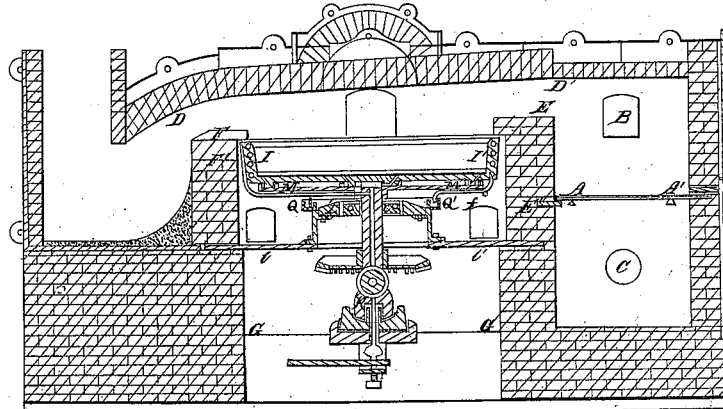
Witnesses.
William Hitchin
W. G. Patton
Inventors
J. P. Grove
John Grove

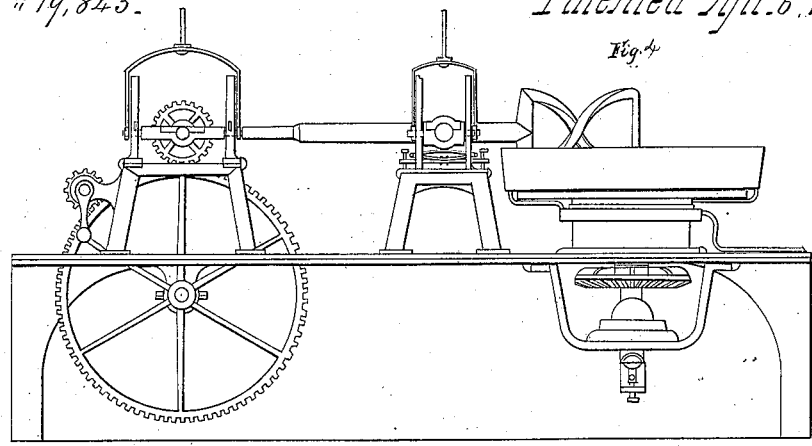
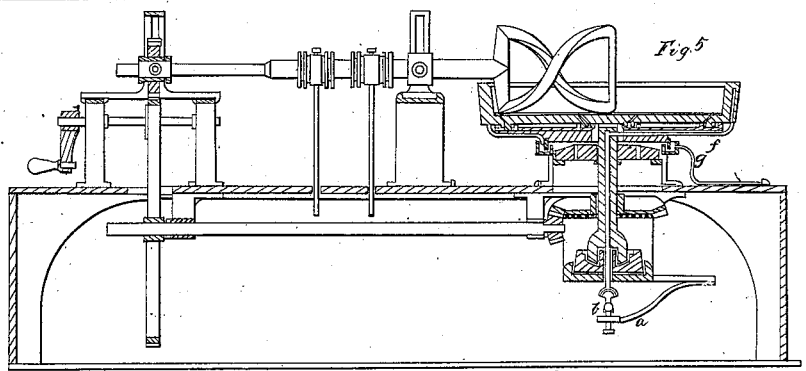
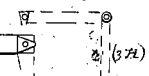
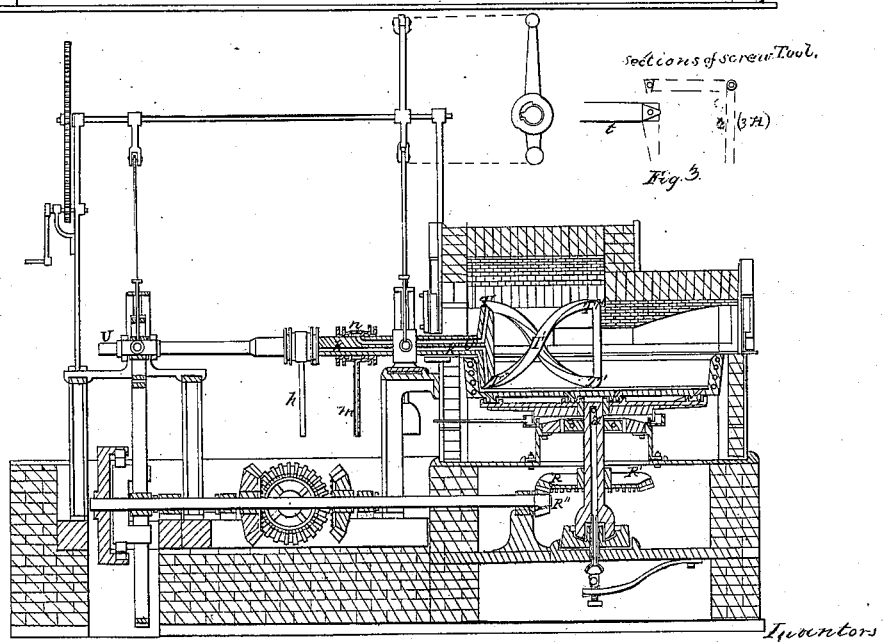

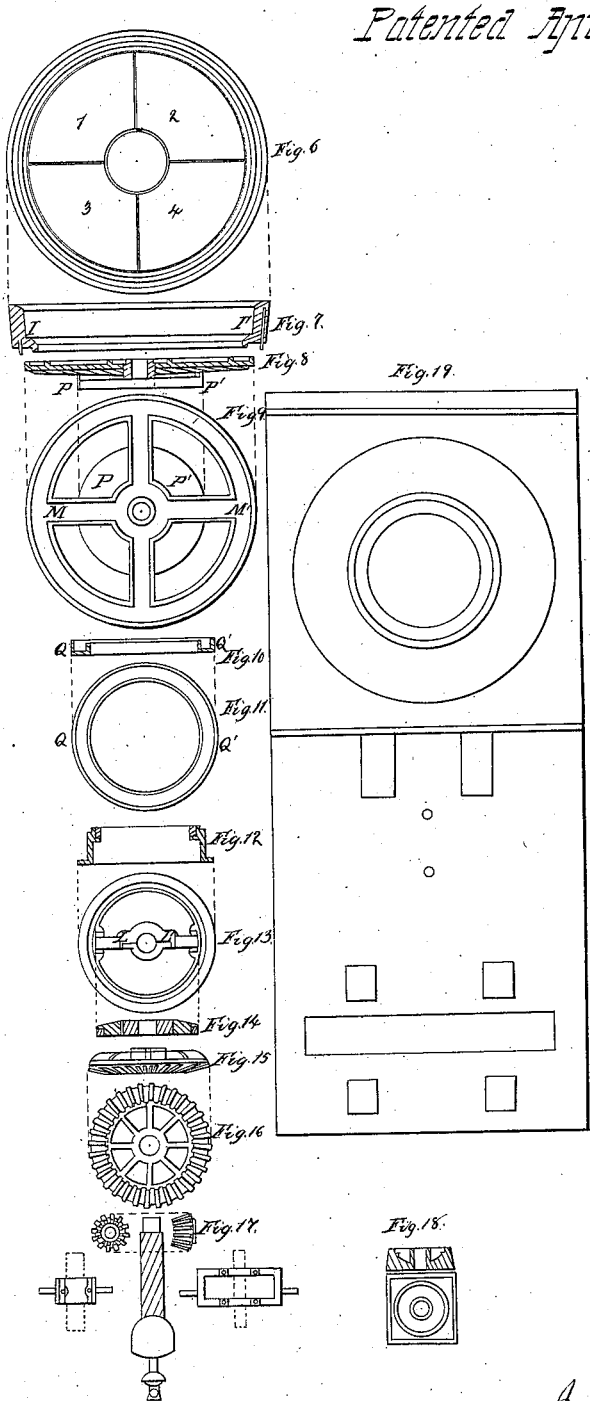

UNITED STATES PATENT OFFICE.

JOHN P. GROVE AND JOHN GROVE, OF MONTOUR COUNTY, PA.

IMPROVEMENT IN PUDDLING-FURNACES.

Specification forming part of Letters Patent No. 19,843, dated April 6, 1858.

*To all whom it may concern:*

Be it known that we, JOHN P. GROVE and JOHN GROVE, both of Montour county, in the State of Pennsylvania, have invented a new and useful Improvement in the Construction of Furnaces for Puddling Iron; and we do hereby declare the following to be a full and exact description of the same, reference being had to the annexed drawings, making a part of this specification, in which—

Figure 1 is a horizontal section of a puddling-furnace containing our improvement. Fig. 2 is a vertical longitudinal section of the same. Fig. 3 is a vertical transverse section of the same. Fig. 4 is a side view of the apparatus constituting the revolving bottom of our puddling-furnace. Fig. 5 is a vertical longitudinal section corresponding to Fig. 4. Fig. 6 is a top view of the revolving bottom, shown detached; Fig. 7, a vertical section of the bottom detached. Figs. 8 and 9 are detached views of the support for the revolving bottom. Figs. 10, 11, 12, 13, 14, 15, 16, 17, 18 represent detached portions of the revolving furnace and the gearing, hereinafter explained. Fig. 19 is a detached view of the bed-plate for supporting the machinery.

Heretofore in the process of puddling iron it has been customary to heat the iron in a puddling or reverberatory furnace, and expose the heated iron to constant contact with the atmosphere by stirring up the heated mass while in the reverberatory furnace by means of appropriate tools worked by hand. This has always been found to be very severe labor, and in hot weather exceedingly exhausting on the men engaged in the work. A small quantity of iron only can be worked at one time by the manner in which puddling-furnaces have been heretofore constructed and used. My improvement has for its object the employment of artificial power for working the iron during the process of puddling; and it consists in constructing the puddling-furnace with a rotating or revolving bottom, which can be constantly revolved during the puddling process, in conjunction with the use of a revolving tool adapted to the revolving bottom, for agitating the heated air and exposing it to the free decarbonizing action of the atmosphere. By this improvement a much larger mass of iron can be puddled at one time than heretofore. The work can also be done more thoroughly, economically, and rapidly than by the old process, and much severe and exhausting labor is avoided. A great saving in fuel also is effected thereby.

To enable others skilled in the art to construct and use this improvement, we proceed to describe its construction and operation.

Fig. 2 shows a vertical longitudinal section of a puddling-furnace with our improvement. A A are the grate-bars. B is the door for charging the fuel. C is the opening of the tuyere. D D' is the top or arch of the reverberatory furnace. E E' is the fire-bridge wall. F F' is the flue-bridge. These parts are constructed in the ordinary manner.

We construct a bed of masonry, G G', to support a step, H H'. This step H H' is constructed with a flange extending all around it, for the purpose of retaining the oil, as shown in Fig. 2. There is no stationary bottom constructed, as is ordinarily placed in reverberatory furnaces, but I I' is a revolving bottom, which corresponds in diameter with the reverberatory furnace. It is composed of the several parts shown in Figs. 6 and 7.

I I', Fig. 7, is a ring or circle of cast-iron, about one-foot deep, and of a diameter corresponding with the horizontal section of the furnace.

1, 2, 3, 4, and 5, Fig. 6, show the pieces composing the bottom of the revolving floor I I'. These pieces 1, 2, 3, and 4 are made of cast-iron, each being a quarter-circle, and are about one and one-half to two inches in thickness. These pieces are fitted together and laid upon a rim or projection around the lower edge of I I'. The rim I I' is cast so as to have a continuous circulating-tube through it for the passage of water to keep the revolving bottom from burning. This revolving bottom is lined with cinder or other refractory material. This revolving bottom is supported in the following manner: A vertical shaft or spindle, K K', rests at its lower extremity upon a step, H H', and also passes through a box, L L', which box rests upon a cross-plate, *l l'*, attached to the masonry. Upon the top of the shaft K K' a circular plate of cast-iron, M M', rests. (Shown detached in Figs. 8 and 9.) This plate is keyed first to the shaft at its center. This plate has two sets of circular projections or flanges cast upon its upper surface, and four sets of radial projections, so as to form two circular grooves extending around the plate M M', and four radial grooves. Into these grooves corresponding projections fit, which extend down from the lower side of the revolving bottom I I'. The position of these circular and radial grooves and the projections on the lower surface of the revolving bottom is shown by the sections Figs. 8 and 9 and also by Figs. 2, 3, and 5. The projections of the bottom I I', having been fitted into the plate M M' below, they are kept there by means of melted cinder inserted therein.

On the under side of the plate M M' a circular plate, P P', Figs. 8 and 9, is cast. Around the circumference of this plate is a flange of about eight or ten inches vertical projection. Immediately under this plate P P' is a circular groove or trough, Q Q', (see Figs. 10 and 11,) into which the flange on P P' fits. The flange on P P' revolves in the trough or groove Q Q'. The trough Q Q' is filled and kept full of water for maintaining an air-tight joint at the intersection of P P' and Q Q'. A bevel-wheel, R R', is placed on the lower part of the vertical shaft and another bevel-wheel gears into it. This second wheel is connected with the main driving power by any convenient gearing. By this construction of the bottom it can be made to revolve constantly while the puddling process is going on.

In order to keep the working parts from getting overheated or destroyed, a constant circulation of water is maintained through the vertical shaft and through the interior of the rim I I', and then through the circular trough or groove Q Q'. The water enters at $a$, passes through a cup-and-ball joint at $b$ into a tubular projection of the step H H', thence through the vertical shaft to the point $d$, whence it passes by the tube $e$ to the point $d$, whence it passes by the tube $e$ to the top of the tubular casing of the rim I I'. After pursuing a descending spiral course through this rim, the water passes into the circular trough Q Q' by the tube $f$, and thence escapes by the tube $g$. By this means a constant circulation of water is maintained through the interior of the shaft and revolving bottom, and the parts are kept from burning and in working order.

In conjunction with the revolving bottom we also employ a revolving tool shaped as shown at T T' T'' and T''' T$^{iv}$ T$^v$. It is composed of wrought-iron hardened or covered with cast-iron, and is made with a tubular passage throughout its interior. This tool is the shape of a double screw with a half-twist. It is attached to a horizontal shaft, U U'. The sections of the arms of this screw are triangular, as shown at $t$, Fig. 3, A.

A constant circulation of water through the interior of the revolving tube T T' is maintained as follows: The water enters through the tube $m$, which connects by a water-box with the tubular passage $n\,n'$, formed in the shaft U U'; thence the water passes through the tubular passage on the inside of T T' T'' and returns through the T'' T$^{iv}$, thence through T$^{iv}$ T' T''', thence through $k\,k'\,k''$ to the stuffing-box attached to the tube $p$, whence the water finally escapes. The shaft U U' is revolved constantly by any convenient power.

In order effectually and thoroughly to agitate and work the mass of heated iron, the direction of revolution of the bottom, and also of the tool, are reversed every five minutes or thereabout. The effect of the revolving bottom is to bring constantly to the action of the tool all parts of the mass of iron. The revolving tool thoroughly agitates the mass of iron as it is brought around by the revolving bottom.

Our improved puddling-furnaces, as above described, have enabled us to work a much larger quantity of iron at one time (with a great saving in fuel and with an improved quality of iron) than has been heretofore done. The work also is uniform in all seasons, and is independent of the skill of the workmen, and a great waste of material is avoided, in consequence of which the cost of puddling is greatly reduced.

We do not claim the invention of revolving bottoms for puddling-furnaces; but

What we do claim is—

1. The employment of a revolving bottom for a puddling-furnace, arranged with water-tubes for cooling it, and with the peculiar air-tight joint described, the whole arranged and operating substantially as hereinbefore described.

2. The employment, in a puddling-furnace, of a revolving tool arranged and operating in the manner and for the purpose substantially as above described.

J. P. GROVE.
JOHN GROVE.

Witnesses:
WILLIAM KITCHEN,
W. G. PATTON.